WIRE WRAPPING HEAD

Original Filed Oct. 3, 1963 2 Sheets-Sheet 1

INVENTORS
John O. Etchison, Jr.
Jack C. Hetherington,
BY D. W. Marks
ATTORNEY

WIRE WRAPPING HEAD

Original Filed Oct. 3, 1963 2 Sheets-Sheet 2

United States Patent Office

Re. 26,791
Reissued Feb. 17, 1970

26,791
WIRE WRAPPING HEAD

John O. Etchison, Jr., Clemmons, and Jack C. Hetherington, Greensboro, N.C., assignors to Western Electric Company, Incorporated, New York, N.Y., a corporation of New York Original No. 3,246,381, dated Apr. 19, 1966, Ser. No. 313,706, Oct. 3, 1963. Application for reissue Apr. 18, 1968, Ser. No. 724,325
Int. Cl. H01r *43/00;* H01b *13/00;* B21f *3/00*
U.S. Cl. 29—203 9 Claims

Matter enclosed in heavy brackets [ ] appears in the original patent but forms no part of this reissue specification; matter printed in italics indicates the additions made by reissue.

*ABSTRACT OF THE DISCLOSURE*

*A wire wrapping bit has an elongated sleeve member and an elongated spindle slidably mounted within the sleeve for receiving an end of a wire and wrapping the end of the wire is received and fully encompassed by a in a longitudinal bore in the tip of the spindle and the end of the wire is received and fully encompassed by a transverse slot formed through the spindle. When the end of the sleeve is moved relative to the slot toward the tip of the spindle, the end of the wire is captured in a longitudinal passageway formed between the sleeve and spindle.*

This invention relates to a [dual] wire wrapping head and more particularly to a [dual] wire wrapping head for [simultaneously] wrapping *a* wire strand onto a [pair of] terminal[s to interconnect the terminals] *to make an electrical connection thereto.*

In the manufacture of electrical units, it is often necessary to interconnect terminals extending from the units. For example, in the manufacture of electrical units such as printed circuit boards, telephone terminal boards, and the like, it may be necessary to electrically interconnect two terminals extending from the units. This may be accomplished by wrapping the stripped ends of a measured length of insulated wire strand onto the terminals to form wrapped connections thereon and electrically interconnect the terminals. It is economically desirable to perform such a cycle of operation at high speeds.

Throughout the remainder of the specification, the terms "hookup lead," and "lead," are indicative of a broad class of strand-like articles which includes insulated or bare wire strand, insulated or bare stranded wire, and the like.

One prior art apparatus for simultaneously forming wrapped connections on a pair of terminals includes a pair of wiring tools mounted on a rotary drive. Each wiring tool includes a generally cylindrical spindle having a reduced diameter shank portion and a wrapping head which is provided with a hook-like device for gripping an end of a length of hookup lead. The spindle is mounted for axial movement within a tubular sleeve.

In the operation of this prior art apparatus, a measured length of hookup lead is laid unconfined across the shank portion of the spindles. The spindles are retracted within the sleeves and the hook-like devices of the wrapping heads grip the lead and cooperate with the sleeves to strip the insulation from the ends of the lead. The wiring tools are then advanced onto the terminals and simultaneously rotated in opposite directions to wrap the stripped ends of the hookup lead onto the terminals and form wrapped connections thereon to electrically interconnect the terminals.

A hookup lead having fine, flexible, wire strand is normally used to form wrapped connections to interconnect terminals on these electrical units. When such a hookup lead is laid unconfined upon the shank portion of the spindles of the prior art apparatus, it is subject to vibration of the apparatus air currents, and a variety of forces tending to dislodge the hookup lead and interrupt the cycle of operation. This interruption results in inefficiency, product spoilage, and economic loss.

The apparatus of this invention provides facilities for overcoming these and other problems associated with the prior apparatus. More particularly, provisions are made in the [dual] wire wrapping head of the invention for precluding a length of hookup lead from being dislodged from the [dual] wire wrapping head prior to the wrapping of [the] *a* terminal[s].

Testing of the novel [dual] wire wrapping head revealed that the devices associated with the prior art apparatus for feeding a measured length of hookup lead to the [dual] wire wrapping head were inadequate. Therefore, a new device has been provided which cooperates with the instant [dual] wire wrapping head in a novel manner to achieve improved measuring, severing, and precise feeding of a measured length of hookup lead to the facilities which preclude the hookup lead from being dislodged from the [dual] wire wrapping head prior to wrapping of [the] *a* terminal[s].

An object of this invention is to provide a new and improved [dual] wire wrapping head.

Another object is to provide a new and improved dual wire wrapping head for simultaneously wrapping wire strand onto a pair of terminals to interconnect the terminals.

Another object is to provide a new and improved dual wire wrapping head wherein the stripped ends of a predetermined length of hookup lead are simultaneously wrapped onto a pair of terminals to interconnect the terminals with insulated wire strand therebetween.

Another object is to provide a new and improved [dual] wire wrapping head for [simultaneously] wrapping the end[s] of a measured length of hookup lead onto a [pair of] terminal[s] wherein insulation is stripped from the end[s] of the hookup lead during the wrapping operation.

Another object is to provide a [dual] wire wrapping head for [simultaneously] wrapping the stripped end[s] of a measured length of hookup lead onto a [pair of] terminal[s] wherein the hookup lead is precluded from being dislodged from the [dual] wire wrapping head prior to the wrapping of the terminal[s].

Another object is to provide facilities for accurately measuring, severing, and precisely feeding a measured length of hookup lead to the facilities of the [dual] wire wrapping head which preclude the hookup lead from being dislodged prior to the wrapping of the terminal[s].

With these and other objects in view, a [dual] wire wrapping head illustrating certain features of the invention includes a [pair of] bit[s] having facilities for receiving a [pair of] terminal[s], for precluding a measured length of hookup lead from being dislodged from the [dual] wire wrapping head prior to a wrapping operation, and for confining the stripped end[s] to guide the lead during a wrapping operation.

In a specific embodiment of this [dual] wire wrapping head, each bit includes a spindle concentrically mounted within a sleeve. Each spindle is provided with a terminal receiving bore in the end of the spindle, a transverse guide slot through which the length of hookup lead passes for precluding the lead from being dislodged prior to the wrapping operation, and a longitudinal groove. Each sleeve is provided with an elongated passage which cooperates with the longitudinal groove of its associated spindle for stripping insulation from an end of the lead during the wrapping operation and for confining the stripped end to guide the lead during the wrapping operation.

Other objects and advantages of the invention will become apparent from a consideration of the detailed specification and the accompanying drawings, wherein.

Figure 4:
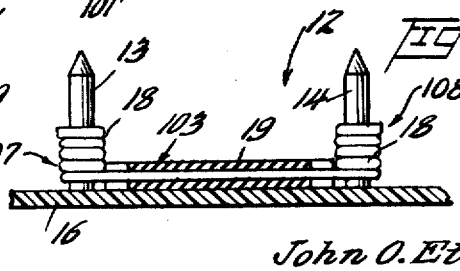
FIG. 4 is a view showing a pair of terminals electrically interconnected by a length of hookup lead.

Referring to FIG. 4, there is shown an electrical unit 12 such as a printed circuit board, a telephone terminal block, or the like, having a pair of conventional terminals 13 and 14 extending from a base 16 of the unit. Terminals 13 and 14 are mechanically and electrically interconnected by a measured length of hookup lead 17 (shown in FIG. 2). Leads 17 comprises an electrically conductive fine gauge, flexible wire strand 18 and a covering of insulation 19.

Figure 1:
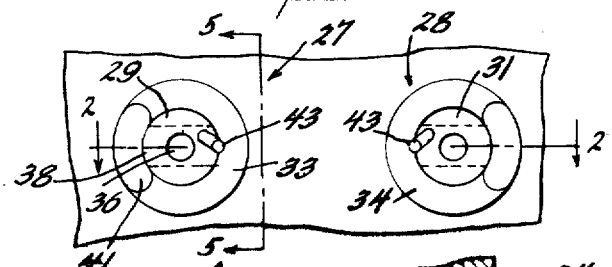
FIG. 1 is an end view of a pair of bits of a dual wire wrapping head embodying certain principles of the invention, each bit including a spindle mounted concentrically within a sleeve, each spindle having a transverse guide slot and a longitudinal groove, and each sleeve having an elongated passage.
Figure 2:
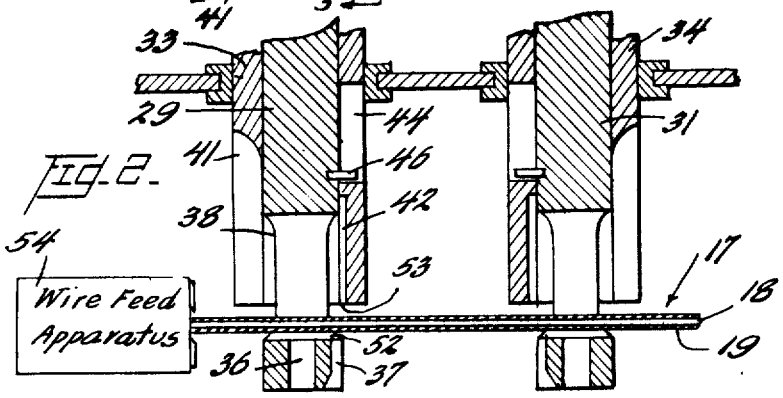
FIG. 2 is a sectional view taken along the line 2—2 of FIG. 1 with the addition of a length of hookup lead passing through the transverse guide slots of the spindles.
Figure 3:
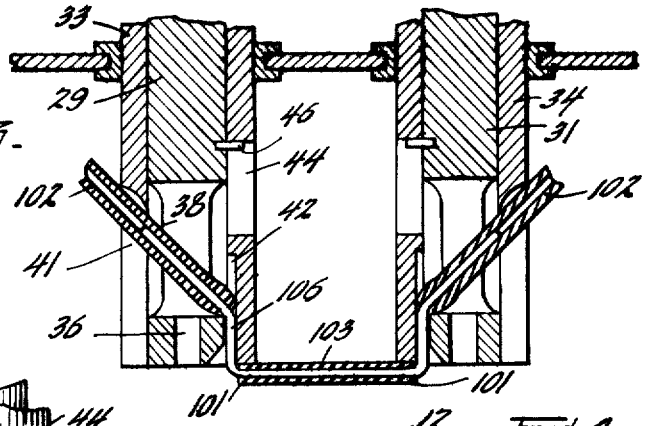
FIG. 3 is a view similar to FIG. 2 showing the spindles retracted within the sleeves.

Referring to FIGS. 1, 2 and 3, a pair of bits 27 and 28 of the dual wire wrapping head includes spindles 29 and 31 slidably movable within sleeves 33 and 34. Since bits 27 and 28 are identical in construction, only bit 27 will be described. Spindle 29 has an axial, longitudinally, extending terminal receiving bore 36 and a longitudinal groove 37 of semi-circular cross section on the side of the tip portion of the spindle. Groove 37 has a diameter substantially equal to the diameter of wire strand 18.

Figure 5:
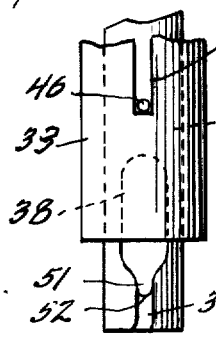
FIG. 5 is a side view taken along the line 5—5 of FIG. 1 showing the transverse guide slot and longitudinal groove of one of the spindles.

A transverse guide slot 38 extends through spindle 29 and intersects the longitudinal axis of groove 37. As best seen in FIG. 5, guide slot 38 tapers to provide a connection between the guide slot and groove 37. Groove 37 curves about the end of spindle 29 to meet terminal receiving bore 36.

The end geometry of spindle 29 is identical to that of a spindle invented by Messrs. J. O. Etchison and J. C. Hetherington and is disclosed in copending application for patent, [serial number 230,759] *Patent No. 3,213,894,* which is assigned to the same assignee as this application. That application teaches that when a wire strand is wrapped around a terminal, the wire strand naturally assumes an arcuate path which has a predetermined radius of bend, referred to in the above application as the "natural bending radius." The ends of grooves 37 of the spindles of this application are conformed to the "natural bending radius" as taught in the copending application.

Sleeve 33 is mounted over spindle 29 and is accurately machined to provide a slidable metal-to-metal fit between the sleeve and spindle. Sleeve 33 has a cutout portion 41 extending from the end of the sleeve to a point beyond guide slot 38 when spindle 29 is extended as shown in FIG. 2. An elongated passage 42 (FIGS. 2 and 3), of semi-circular cross section and having a diameter equal to the diameter of wire strand 18, is formed axially and longitudinally along the inner surface of sleeve 33. Passage 42 extends from the end of sleeve 33 to a point beyond the upper end of groove 37 when the end spindle 29 and the sleeve are flush as shown in FIG. 3.

Passage 42 is opposite and aligned with groove 37 and together the passage and groove form a guideway 43 equal to the diameter of wire strand 18. An elongated longitudinally extending channel 44 is formed through sleeve 33. A pin 46 is firmly fixed to spindle 29 and is mounted for slidable movement within channel 44. Pin 46 permits relative longitudinal movement, but prevents relative rotational movement, of the spindle and sleeve.

Bits 27 and 28 are mounted in a conventional machine (not shown and forming no part of this invention) for moving the spindles within and out of the sleeves and for simultaneously rotating the bits in opposite directions, for example, the Automatic "Wire-Wrap" Machines Models 14F and 14P produced by the Gardner-Denver Company of Grand Haven, Mich.

Figure 6:
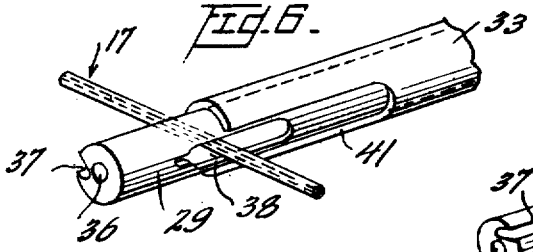
FIG. 6 is a perspective view of one of the bits showing the lead passing through the transverse guide slot of the spindle.
Figure 7:
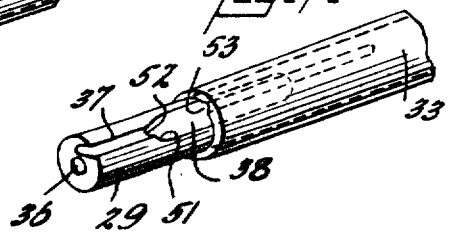
FIG. 7 is a perspective view of one of the bits showing a cutting edge of the longitudinal groove of the spindle and a cutting edge of the elongated passage of the sleeve.

In FIGS. 5, 6, and 7, there is shown in detail guide slot 38 formed in spindle 29. Guide slot 38 tapers down to a neck 51 (FIGS. 5 and 7) which has a diameter equal to that of hookup lead 17. Neck 51 narrows down to the diameter of wire strand 18 at the entrance to groove 37. Groove 37 is provided with a cutting edge 52 at the point where neck 51 meets the groove. Sleeve 33 is provided with a cutting edge 53 at the end of passage 42 at the tip of the sleeve (FIGS. 2 and 7).

Figure 8:
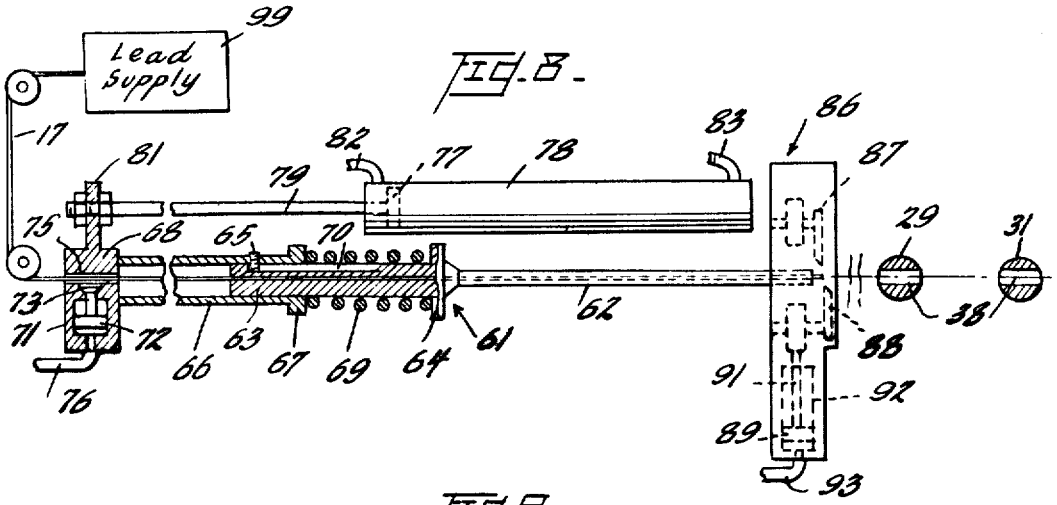
FIG. 8 is a front view partially in section showing facilities for feeding a predetermined length of hookup lead through the transverse guide slots of the spindles.

Referring to FIG. 8, wire feed apparatus 54 (shown in block outline in FIG. 2) includes a hollow wire guide tube 61 having a needle portion 62 and an enlarged cylindrical portion 63. Cylindrical portion 63 is provided with a stop collar 64 and is mounted for slidable movement within a sleeve 66. Sleeve 66 is provided with a stop collar 67 and is mounted on a gripper block 68. A compression spring 69 is confined between collars 64 and 67 and urges wire guide tube 61 to the right with respect to sleeve 66, shown in FIG. 8. A pin 65 is mounted on sleeve 66 and extends into a channel 70 formed in cylindrical portion 63 to prevent spring 69 from projecting guide tube 61 out of the sleeve.

Gripper block 68 includes a cylinder 71 containing a piston 72 with a plunger 73 attached thereto. A guide channel 75 passes through gripper block 68 and is aligned with the passage within wire guide tube 61. Pressurized fluid may be introduced into cylinder 71 through fitting 76.

A piston 77 is contained within a double acting cylinder 78 and is connected to a piston rod 79 which is attached to a lug 81 mounted on gripper block 68. Pressurized fluid may be introduced alternatively into either end of double acing cylinder 77 through fittings 82 and 83.

A cutting assembly 66 (shown in outline) includes a pair of cutting blades 87 and 88 which are actuated through a set of gears (shown in outline) by a piston rod 91 connected to a piston 89 within a cylinder 92. Pressurized fluid may be introduced into cylinder 92 through a fitting 93. It will be obvious to one skilled in this art that the pressurized fluid cylinders could readily be replaced with an appropriate system of electrically operated solenoids, or other appropriate systems.

OPERATION OF WIRE FEED APPARATUS

Figure 9:
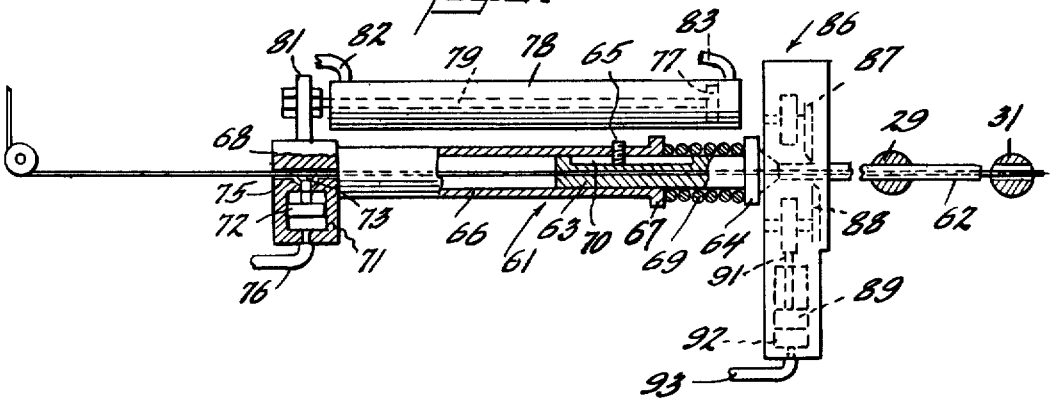
FIG. 9 is a view showing the wire feeding facilities projecting a predetermined length of hookup lead through the transverse guide slots of the spindles.

In FIGS. 8 and 9, there are shown in outline form the pair of spindles 29 and 31 having aligned transverse guide slots 38. In FIG. 8, the wire feed apparatus is shown in readiness for a cycle of operation. Pressurized fluid is introduced through fitting 76 to drive plunger 73 into locking engagement with an indeterminate length of hookup lead 17 being fed from a supply 99.

Pressurized fluid is then introduced through fitting 82 into double-acting cylinder 78 to drive piston 77 to the right. This action moves gripper block 68 with lead 17, sleeve 66, and wire guide tube 61 to the right until collar 64 engages a wall of cutting assembly 86. Gripper block 68 with lead 17 and sleeve 66 continue to move to the right until the position shown in FIG. 9 is attained.

In this manner, needle portion 62 is projected through guide slot 38 of spindle 29 (FIG. 9) and stops just short of spindle 31. Lead 17 is projected beyond the end of needle potion 62 and through guide slot 38 of spindle 31. Spindle 31 is then withdrawn into sleeve 34 to hold lead 17 in place.

Pressurized fluid is evacuated from cylinder 71 to disengage plunger 73 from lead 17. Pressurized fluid is introduced through fitting 83 into double-acting cylinder 78 to drive piston 77 back to its initial position (FIG. 8). This action moves gripper block 68 and wire guide tube 61 to their initial starting positions (FIG. 8). During this movement, lead 17 is held in place by spindle 31 and sleeve 34. Pressurized fluid is then introduced through fitting 93 into cylinder 92 to actuate cutting blades 87 and 88 to sever lead 17 and leave a measured length extending through guide 38 of spindles 29 and 31.

OPERATION OF DUAL WIRE WRAPPING HEAD

Referring to FIGS. 1–4, after wire feed apparatus 54 has severed and projected predetermined length of lead 17 through guide slots 38 of spindles 29 and 31, the lead rests in the guide slots of the spindles (FIGS. 2 and 6). Lead 17 is positively precluded from being dislodged from the dual wire wrapping head due to vibration, air currents, retraction of the spindles into the sleeves, or for other like reasons, by guide slots 38 which completely surround the lead.

Spindle 29 is retracted until it reaches the partially retracted position of spindle 31 and then both spindles are fully retracted within sleeves 33 and 34, respectively.

It will be apparent to one skilled in this art that spindle 31 could also be fully retracted within sleeve 34 (as shown in FIG. 3) and then spindle 29 could be retracted within sleeve 33.

As the spindles are being retracted, cutting edges 52 of grooves 37 and cutting edges 53 of passages 42 become aligned and peripherally sever insulation 19 of lead 17 at points 101 (FIG. 3). The spindles continue to be retracted until the ends of the spindles are flush with the ends of the sleeves. As noted above, groove 37 and passage 42 define a guideway 43 having a diameter substantially equal to the diameter of wire strand 18. Therefore, as the spindles are retracted within the sleeves, cutting edges 52 of grooves 37 cooperate with passages 42 to strip portions 102 (FIG. 3) of insulation 19 from the ends of the measured length of lead 17.

In FIG. 3, spindles 29 and 31 are shown fully retracted within sleeves 31 and 33. A length of lead 103 extends between bits 27 and 28. A section 106 of wire strand 18 is confined in each guideway 43 formed by groove 37 and passage 42. Portions 102 of insulation 19 have been stripped from the ends of lead 17.

Bits 27 and 28 are then advanced so that terminals 13 and 14 are received within terminal receiving bores 36 of the spindles. Bits 27 and 28 are then simultaneously rotated in opposite directions to form wrapped connections 107 and 108 on terminals 13 and 14 (FIG. 4). During the wrapping operation wire strand 18 of hookup lead 17 is pulled through guideways 43 and portions 102 of insulation 19 are stripped from the ends of the lead.

Control of the sequence of operations of the wire feed apparatus and dual wire wrapping head may be accomplished in a number of conventional ways, for example a punched tape system may be used for directing the various steps of the operations described. Another arrangement may use a system of switches and solenoids whose sequence is controlled by a cam system and a motor driven cam shaft.

It will be obvious to one skilled in this art that bare wire strand could be used in place of hookup lead in a given application and that no modification of the dual wire wrapping head described would be necessary. It will be understood that the apparatus described is merely illustrative of the principles of this invention and that other embodiments may be devised without departing from the scope of the invention.

What is claimed is:

[1. A dual wire wrapping head for interconnecting terminals with hookup lead, comprising a pair of wrapping bits, each bit having means thereon for engaging a terminal, means for guiding hookup lead about the terminal, and a guide slot formed transversely through the bit for receiving and for fully encompassing a length of hookup lead projected through the guide slot.]

2. A [dual] wire wrapping head for interconnecting terminals with hookup lead including a [pair of] wrapping [bits, each] bit comprising an elongated sleeve member, [and]

an elongated spindle slidably mounted within the sleeve and having means thereon for [engaging] *receiving* a terminal [and means for guiding hookup lead about a terminal], the spindle having a guide slot passing transversely [therethrough] *to the longitudinal axis of the spindle* for receiving and completely surrounding a length of hookup lead projected therethrough in preparation for wrapping about the terminal, *and*

*a longitudinal passageway formed between the sleeve and spindle, the passageway being adapted to capture the end of the hookup lead.*

3. A dual wire wrapping head for interconnecting terminals with a measured length of hookup lead, comprising a pair of bits, each bit having means formed therein for receiving a terminal, means communicating with the receiving means for guiding hookup lead onto the terminal, and a guide slot passing transversely through the bit for receiving and for fully encompassing a length of hookup lead, and means for projecting a length of hookup lead through the guide slots, for measuring and severing the length of hookup lead within the slots to the measured length in preparation for interconnecting the terminals with the measured length of hookup lead.

4. A [dual] wire wrapping head having a [pair of bits] *bit* for wrapping the end[s] of a measured length of hookup lead onto a [pair of spaced] terminal[s, each bit] comprising a spindle having a bore for receiving a terminal and an external groove extending longitudinally from the tip of the spindle, the spindle also having a [transverse] guide slot formed *transversely to the longitudinal axis of the spindle* through the spindle and terminating in the other end of the groove for receiving and completely encompassing the hookup lead to maintain the hookup lead in a predetermined position prior to wrapping, and a sleeve slidably mounted over the spindle and having an internal, longitudinally extending passage aligned with the groove of the spindle, the passage and groove defining a guideway for guiding the hookup lead during the wrapping of the terminal.

5. A [dual] wire wrapping head having a [pair of] bit[s] for wrapping the bare end[s] of a measured length of hookup lead made up of an insulated wire strand onto a [pair of spaced] terminal[s, each bit] comprising a spindle having a guide slot formed transversely *to the longitudinal axis of the spindle* through the spindle for receiving and for fully encompassing the lead to maintain the lead in a predetermined position prior to wrapping about a terminal, the spindle having an external groove extending longitudinally from the tip of the spindle and terminating in the guide slot, the spindle having a cutting edge formed at the end of the groove terminating in the guide slot, and a sleeve slidably mounted over the spindle having an internal longitudinally extending passage which intersects the end of the sleeve to define a cutting edge, the cutting edges of the sleeve and spindle being cooperable to peripherally sever only the insulation at a predetermined distance from an end of the lead, the groove and passage together defining a guideway substantially equal in diameter to the diameter of the bare end of the lead.

6. A dual wire wrapping head for interconnecting terminals with hookup lead made up of an insulated wire strand including a pair of wrapping bits, each bit comprising an elongated sleeve having an internal, longitudinally extending passage formed therein which intersects the tip portion of the sleeve to define a first cutting edge, and a spindle slidably mounted within the sleeve and having means thereon for receiving a terminal and means for guiding wire strand about the terminal, the spindle having an elongated longitudinally extending guide slot passing transversely therethrough, the guide slot defining an opening nearest the tip of the spindle substantially equal in diameter to the diameter of the wire strand, the spindle having an external, longitudinally formed groove which extends from the tip of the spindle to intersect the opening to define a second cutting edge cooperable with the first cutting edge to shear only the insulation of the hookup lead, the groove and passage together defining a guideway substantially equal in diameter to the diameter of the wire strand.

7. In a [dual] wrapping head for wrapping the bare end[s] of a measured length of [hookup lead made of] an insulated wire strand onto a [pair of spaced] terminal[s], a [pair of] bit[s, each bit] comprising an elongated sleeve having an internal, longitudinally extending passage formed therein, and an elongated spindle mounted for slidable movement within the sleeve and having a guide slot formed longitudinally in and passing transversely through the *axis of the* spindle for completely encompassing and maintaining the hookup lead in a predetermined position prior to wrapping a bare end about a terminal, the spindle having an external, longitudinally extending groove cooperable with the passage to define a guideway of a diameter substantially equal to the diameter of the wire strand for maintaining the wire strand in a longitudinal path, the spindle having a neck portion for directing the hookup lead from the slot to the guideway, the spindle also having means for receiving a terminal and means for guiding the wire strand from the guideway onto a terminal.

8. An apparatus for wrapping the ends of a measured length of hookup lead onto a pair of spaced terminals, comprising a pair of spindles, each spindle having a bore for receiving a terminal and an external, longitudinally extending groove formed in the spindle with one end of the groove curling over the tip of the spindle to intersect the bore, the spindle also having a transverse guide slot formed through the spindle and terminating in the other end of the groove for receiving and completely encompassing the hookup lead to maintain the hookup lead in a predetermined position prior to wrapping, a pair of sleeves, each sleeve slidably mounted over one spindle and having an elongated passage aligned with the groove of the spindle, the passage and groove defining a guideway for guiding the end of the hookup lead during the wrapping of the terminal hollow needle-like tube projectable through one guide slot to carry hookup lead through the guide slots, a hollow needle-like tube projectable through one guide slot to carry hookup lead through the guide slots, means for projecting the needle-like tube with the hookup lead through one guide slot and for retracting only the needle-like tube from the guide slots, and cutting means for severing the hookup lead to the measured length after the needle-like tube has been retracted from the guide slot.

*9. A wire wrapping head having a bit for wrapping the end of a wire onto a terminal, comprising:*

*a spindle having a longitudinal bore in one end for receiving a terminal and a guide slot formed transversely to the longitudinal axis of the spindle through the spindle for receiving the end of the wire;*

*a sleeve slidably mounted on the spindle such that one end of the sleeve slides over the transverse slot to the one end of the spindle; and*

*a longitudinal passageway formed between the spindle and sleeve from the transverse slot to the one end of the spindle and one end of the sleeve for capturing the end of the wire when the one end of the sleeve slides over the transverse slot to the one end of the spindle.*

*10. A wire wrapping head having a bit for wrapping the end of a wire onto a terminal, as defined in claim 9, wherein:*

*the transverse guide slot tapers to provide a connection between the guide slot and passageway.*

References Cited

The following references, cited by the Examiner, are of record in the patented file of this patent or the original patent.

UNITED STATES PATENTS

| | | | |
|---|---|---|---|
| 2,682,063 | 6/1954 | Miloche | 7—14.1 |
| 2,696,656 | 12/1954 | Madden | 29—33 |
| 2,743,502 | 5/1956 | Reck | 29—33 |
| 2,746,124 | 5/1956 | Belek | 242—7 X |
| 2,807,810 | 10/1957 | Belek et al. | 7—14.1 |
| 3,191,879 | 6/1965 | Allen | 29—203 |
| 3,213,894 | 10/1965 | Etchinson et al. | 242—7.03 |

THOMAS H. EAGER, Primary Examiner

U.S. Cl. X.R.

7—14.1; 140—122, 124; 242—7.03